(12) United States Patent
Shih et al.

(10) Patent No.: US 8,674,933 B2
(45) Date of Patent: Mar. 18, 2014

(54) INTEGRATED SYSTEM WITH COMPUTING AND IMAGING CAPABILITIES

(75) Inventors: Wei-Yan Shih, Plano, TX (US); Henry W. Neal, Allen, TX (US); Michael McCormick, Allen, TX (US); Paul Gerard Barker, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1227 days.

(21) Appl. No.: 11/942,122

(22) Filed: Nov. 19, 2007

(65) Prior Publication Data

US 2009/0128481 A1    May 21, 2009

(51) Int. Cl.
*G09G 5/00*    (2006.01)

(52) U.S. Cl.
USPC .............. 345/156; 345/84; 345/86; 345/905; 359/460; 353/74

(58) Field of Classification Search
USPC .............. 345/156, 176, 173, 84, 86, 905, 32; 361/679.01, 679.29; 340/5; 359/460; 353/74
See application file for complete search history.

(56) References Cited

U.S. PATENT DOCUMENTS

| | | |
|---|---|---|
| 5,289,287 A | 2/1994 | Dargis et al. |
| 5,483,250 A | 1/1996 | Herrick |
| 5,510,806 A | 4/1996 | Busch |
| 5,630,659 A | 5/1997 | Ronzani et al. |
| 5,658,063 A | 8/1997 | Nasserbakht |
| 5,669,688 A | 9/1997 | Baar et al. |
| 5,803,569 A | 9/1998 | Ma |
| 5,847,748 A | 12/1998 | Laughlin |
| 5,876,105 A | 3/1999 | Rodriquez, Jr. |
| 6,262,884 B1 | 7/2001 | Hwang et al. |
| 6,414,728 B1 | 7/2002 | Faris et al. |
| 6,489,934 B1 | 12/2002 | Klausner |
| 6,522,419 B1 | 2/2003 | Ko |
| 6,525,750 B1 * | 2/2003 | Knox .............................. 345/30 |
| 6,626,543 B2 | 9/2003 | Derryberry |
| 6,806,850 B2 | 10/2004 | Chen |
| 6,930,669 B2 | 8/2005 | Weiner et al. |
| 7,133,022 B2 | 11/2006 | Grabert |
| 7,161,609 B2 | 1/2007 | Barbour et al. |
| 7,188,958 B2 | 3/2007 | Zoidis et al. |
| 7,303,282 B2 | 12/2007 | Dwyer et al. |
| 7,440,266 B2 * | 10/2008 | Yu ............................ 361/679.27 |
| 2001/0000056 A1 * | 3/2001 | Kakuda et al. .................... 349/5 |
| 2003/0011582 A1 * | 1/2003 | Morita .......................... 345/204 |
| 2004/0017548 A1 | 1/2004 | Denmeade |
| 2004/0061683 A1 * | 4/2004 | Mochizuki et al. ........... 345/168 |
| 2006/0209012 A1 * | 9/2006 | Hagood, IV ................... 345/109 |
| 2007/0013873 A9 * | 1/2007 | Jacobson et al. ................ 353/30 |
| 2009/0046035 A1 | 2/2009 | Wen |

* cited by examiner

*Primary Examiner* — Lun-Yi Lao
*Assistant Examiner* — Shaheda Abdin
(74) *Attorney, Agent, or Firm* — Alan A. R. Cooper; W. James Brady, III; Frederick J. Telecky, Jr.

(57) ABSTRACT

An integrated system comprising both imaging and computing capabilities comprises a light valve and a CPU, as well as other functional members for performing computing and imaging.

19 Claims, 6 Drawing Sheets

INTEGRATED SYSTEM WITH COMPUTING AND IMAGING CAPABILITIES

TECHNICAL FIELD OF THE DISCLOSURE

The technical field of this disclosure relates to the art of computing devices and display systems; and more particularly to the art of integrated systems with both computing and imaging capabilities.

BACKGROUND OF THE DISCLOSURE

There has always been a strong desire of integrated systems with both computing and imaging capabilities, preferably with flexible screen sizes. Most current display systems and computing systems, however, exist as separate products. A computing system is referred to as a system that employs a central-processing-unit (CPU) having at least an algorithmic-logic-unit (ALU), such as a personal-computer and other dedicated computers for specific applications. An imaging system is referred to as a system that is capable of producing and/or reproducing images (video frames) on a screen. Combined applications of a computing system and an imaging system are often accompanied by repeating functional modules in the computing and imaging systems, such as image signal processing modules, volatile and/or non-volatile storages, buffers, power supplies, interfaces to peripheral devices, bus structures, and data control units. The combined applications also involve tedious connections of the imaging and computing systems with variety of cables. Once such combined systems are setup, they are often bulky and ponderous, which significantly reduces portability of the combined system. Moreover, the combined computing and imaging systems often lack the capability of dynamically adjusting screen sizes.

Therefore, an integrated system with both computing and imaging abilities, while substantially without repeating or redundant functional modules is desired. Though not required, the integrated system preferably comprises capability of dynamically changing screen sizes.

SUMMARY

As an example, an integrated system is disclosed herein. The system comprises: a light valve for generating an image processed by the system; a central-computing-unit capable of performing algorithmic and logic operations, wherein the central-control-unit (CPU) and the light valve are enclosed within an enclosure; and an image data control unit that is connected to the CPU and the light valve for preparing image data that can be displayed by the light valve.

As another example, an enclosure for use in a system having imaging and computing capabilities is disclosed herein. The enclosure comprises: a side wall with an inlay screen attached thereto.

As still yet another example, an integrated system is disclosed herein. The system comprises: computing means for performing algorithmic or logic operations; imaging means for displaying images produced by the system on a screen with a light valve; and wherein the computing and imaging means are enclosed within a system enclosure.

BRIEF DESCRIPTION OF DRAWINGS

FIG. 1b schematically illustrates a rear-view of an inlay screen disposed in a side wall of the integrated system in FIG. 1a;

FIG. 1c diagrammatically illustrates another side wall of the enclosure of the integrated system in FIG. 1a;

DETAILED DESCRIPTION OF SELECTED EXAMPLES

In view of the forgoing, disclosed herein is an integrated system with both computing and imaging capabilities. In the following, the integrated system which will be discussed with selected examples. It will be appreciated by those skilled in the art that the following discussion is for demonstration purpose and should not be interpreted as a limitation. Other variations within the scope of this disclosure are also included.

Figure 1A:
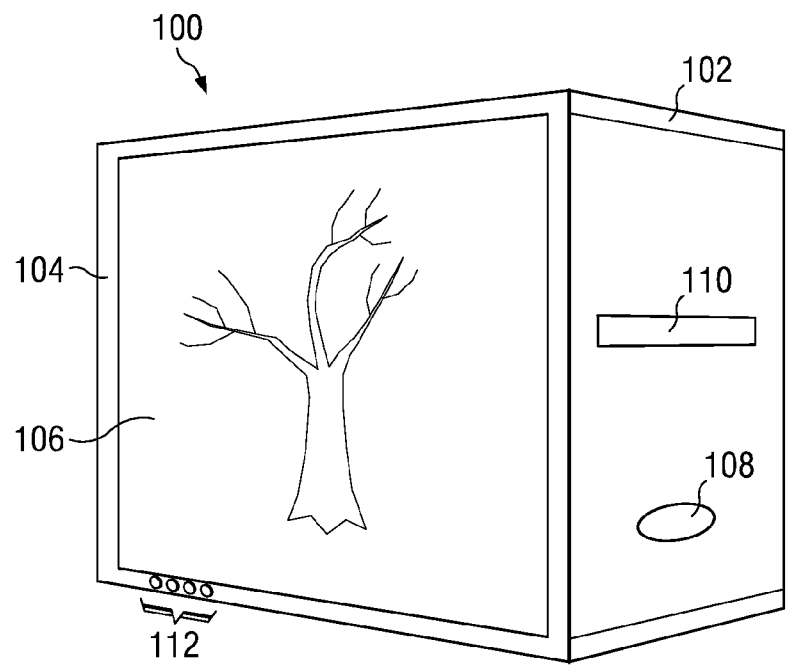
FIG. 1a diagrammatically illustrates an exemplary integrated system with both computing and imaging capabilities.

As a way of example, FIG. 1 diagrammatically illustrates an exemplary integrated system with both computing and imaging capabilities. In this example, integrated system 100 comprises enclosure 102, in which functional modules for computing and imaging are disposed. Enclosure 102 comprises side wall 104 that comprises inlay screen 106 on which images generated by the system (100) can be displayed. The inlay screen (106) can be a screen used by existing rear-projectors or other suitable screens, such as translucent substrates. The inlay screen may have other fine features, such as micro-lenses therein/thereon for enhancing the viewing effect by for example reducing reflection of ambient light incident thereto to viewers. Alternatively, the inlay screen can be a self-light emitting type light valve, such as a liquid-crystal-display panel, a plasma panel, and organic light-emitting-diode (OLED) panel.

Regardless of different nature, inlay screen 106 is preferably, though not required, detachable from side wall 104 and enclosure 102 so as to facilitate installation and inspection of the interior (enclosed) functional members inside enclosure 102. As an example, inlay screen 106 can be attached to side wall 104 with adjustable attaching mechanisms, such as height-adjustable screws, such that the vertical, horizontal, and/or depth positions of the screen can be dynamically adjustable so as to achieve best viewing effects during image displaying. An example of such adjustable mechanisms is schematically illustrated in FIG. 1b.

Figure 1B:
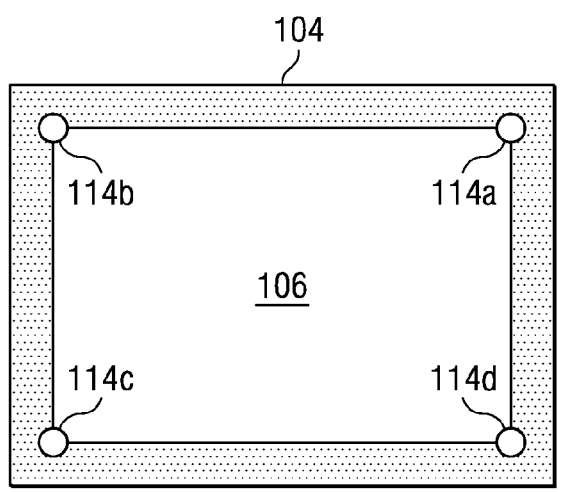

Referring to FIG. 1b, inlay screen 106 is shown as viewed from inside of enclosure 102. The inlay screen is attached to the ledge or the perimeter of side wall 104 through attaching mechanisms 114a, 114, 114c, and 114d at the corners of the inlay screen. Each attaching mechanism comprises a holding member and a position adjusting member. The holding member is capable of anchoring the inlay window at a desired position, which can be a screw, a sticking material, or any suitable devices. The holding member is coupled to the position adjusting member that is capable of moving the holding member in, preferably though not required, three dimensions (vertical, horizontal, and depth). An exemplary position adjusting member can be a step motor with a spring attached thereto. The combination of the holding and position adjusting members together hold the inlay screen at the desired position with dynamic adjustability. For facilitating dynamic adjustment of the inlay screen, the attaching mechanisms can be automatically controllable through, for example, a position control unit that can be a standalone software module stored in a computer-readable medium. Alternatively, the position control unit can be a dedicated electronic device that can be implemented as an application-specific-integrated-circuit, a field-programmable-gate-array, or any other suitable electronic circuits. The position control unit may further comprise a control panel, such as control panel 112 in FIG. 1a, interfacing viewers such that viewers and manufacturers can configure and/or dynamically adjusting the position of the inlay screen. Of course, the position control unit can be provided with other features, such as remote control capabilities. It is noted that the attaching mechanisms as shown in FIG. 1b are for demonstration purpose, a wide range of suitable attaching mechanisms within the scope of this disclosure are also available.

Referring again to FIG. 1a, the inlay screen may further comprise a foldable screen cover (not shown in the figure) for covering the inlay screen when the inlay screen is not in use.

Enclosure 102 may have other side walls with other features deployed therein. For example, reset button 108 for resetting the integrated system can be positioned at one side wall as shown in the figure. The resetting button may be configured to the same function as the standard reset function of existing computers, especially personal-computers. Movable devices, such as DVD (110), CD, movable storage devices (e.g. hard-drives), floppy drives, zip drives, and user control buttons can also be deployed on the side wall. In one example, I/O connection sockets and device bays, which do not require frequent control by users, can be deployed on, preferably, rear-side of the integrated system, as schematically illustrated in FIG. 1c.

Figure 1C:
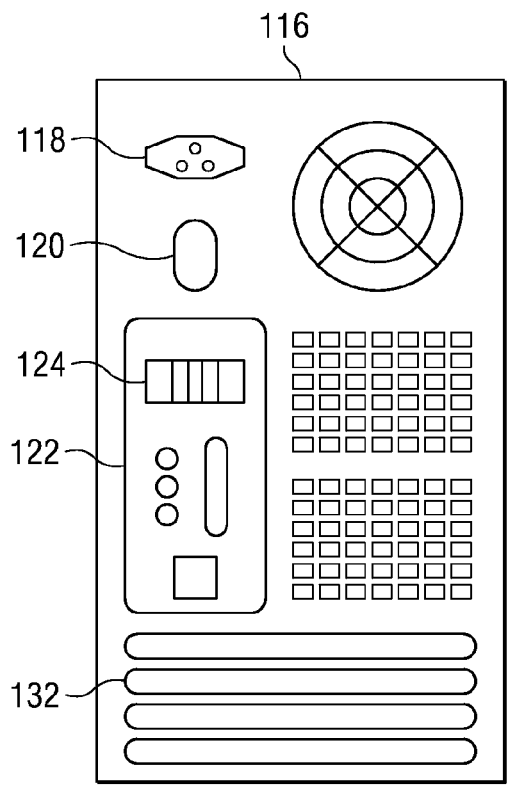

Referring to FIG. 1c, as solely an example, rear-wall 116 of enclosure 102 comprises power socket 118, system power 120, I/O port panel 122, and device slots 132. In the I/O port panel, a wide range of I/O ports can be provided for modems, phone TAMs (telephone/FAX answering machines), internet, keyboard/mouse, joystick, scanners, printers, codec speakers, TVs, auxiliary external screens/monitors, and optical devices, such as DVDs, HDDs, blu-rays, VCRs, cameras/camcorders, and flash drives, and many other peripheral devices. The I/O connections can be of any desired types, protocols, and/or standards, such as IEEE 1394, VGA cable connection, coaxial cable connections, USB connections, wireless (e.g. RF links and WiFi) links, DVI (dual and single link) ports, TDMS ports, Plug&Play ports, analog ports, HDMI (high-definition-multimedia-interface), composite and S-video links, component video connections, DTS audio connections, and many other desired connections, such as TV antenna and cable TV connections.

Figure 2A:
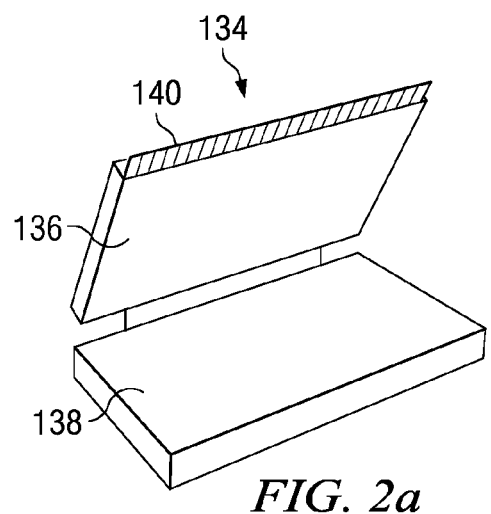
FIG. 2a diagrammatically illustrates another exemplary integrated system with both computing and imaging capabilities.
Figure 2B:
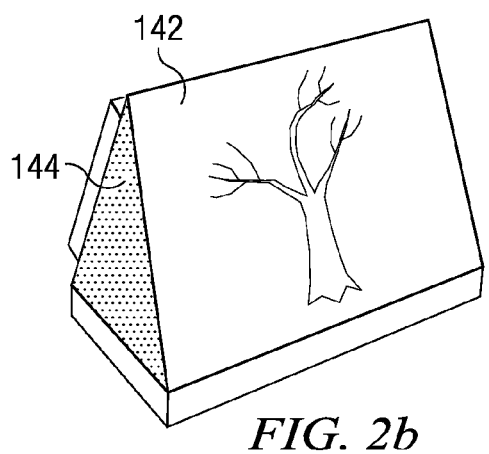
FIG. 2b diagrammatically illustrates the integrated system of FIG. 2a with the screen unfurled.

FIG. 2a and FIG. 2b schematically illustrate another exemplary integrated system. Referring to FIG. 2a, integrated system 134 comprises bottom enclosure 138 in which components for computing and/or imaging are disposed. Key board, mouse pad, and other suitable components can also be deployed on the surface of the bottom enclosure.

Top enclosure 136 can enclose, as an example, portions or all members for imaging. For example, a light source, a light valve for generating images, and optics for directing the light to generate the desired image on the screen can be enclosed within the top enclosure 136. In one example, the top enclosure may comprise an inlay screen as inlay screen 106 discussed above with reference to FIG. 1a, which will not be repeated herein. The top enclosure can also be provided as a protection cover for the integrated system. The same as that for the integrated system discussed above with reference to FIG. 1a, the integrated system in FIG. 2a can be configured to have rear-projection capability. For this purpose, a foldable or rollable screen for displaying the produced images can be provided. The screen can be folded and stored in the integrated system, such as screen extending unit 140. FIG. 2b schematically illustrates the integrated system with the screen (142) unfold from extending unit 140 to the front edge of the bottom enclosure. For increasing the area of the screen as much as possible, the screen extender (140) can be positioned at the top edge of the top enclosure (136) and has a portion that extends outwards from the top edge of the top enclosure, as illustrated in FIG. 2a. For holding the screen at the bottom enclosure, an anchor(s) can be provided on the bottom enclosure. By moving the top enclosure and/or the screen and/or the extending unit, images projected on the screen can have different image sizes and effective viewing areas. The viewing effect can be further enhanced by providing an ambient light shield 144 as shown in FIG. 2b.

Figure 3A:
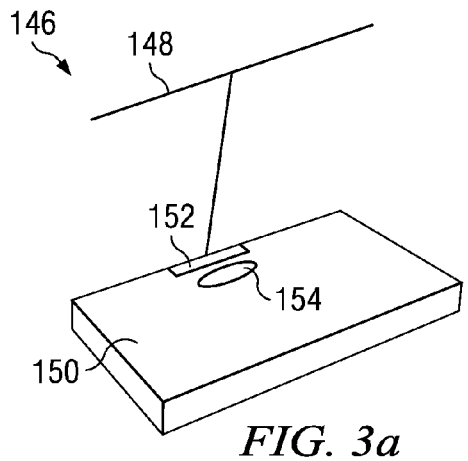
FIG. 3a diagrammatically illustrates yet another exemplary integrated system with both computing and imaging capabilities.
Figure 3B:
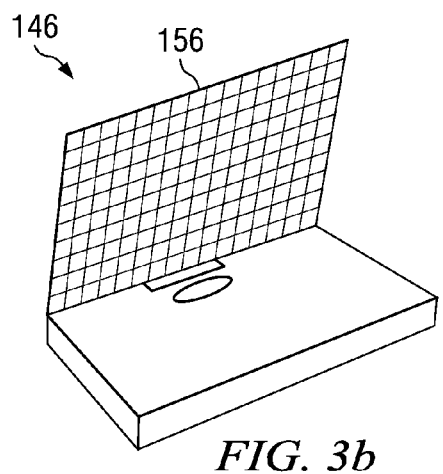
FIG. 3b diagrammatically illustrates the integrated system of FIG. 3a with the screen deployed.

The imaging members, especially the optics of the integrated system can also be disposed in/on the bottom enclosure so as to configure the integrated system to have front projection capabilities, an example of which is schematically illustrated in FIG. 3a. Referring to FIG. 3a, enclosure 150 of integrated system 146 encloses substantially all functional members for imaging and computing. The front projection can be accomplished with optics 154, which can be a projection lens that is disposed on the bottom enclosure (150), as well as folding mirror 152 as an alternative feature. It is noted that optics 154 may comprise a combination of multiple optical lens. In the presence of the folding mirror, optics 154 projects the light carrying image information onto the folding mirror; and the folding mirror projects the light onto a screen. The screen, which is preferably a foldable screen, can be attached to foldable screen frame 148. In the imaging, the foldable screen frame 148 can be unfolded; and the screen (156) can then be attached, as shown in FIG. 3b. With the above configuration, the portability of the integrated system can be significantly increased. Of course, the integrated system can be configured to be operated as many existing front projection system wherein the screen is distanced away from the integrated system. In this instance, the screen frame and the screen may not be necessary; and optics 154 can be disposed on the front side or on the top side of enclosure 150 facing the screen, such as a wall or a screen in a conference room. Alternatively, a fold mirror may be employed to direct light from optics 154 to the screen.

Figure 4:
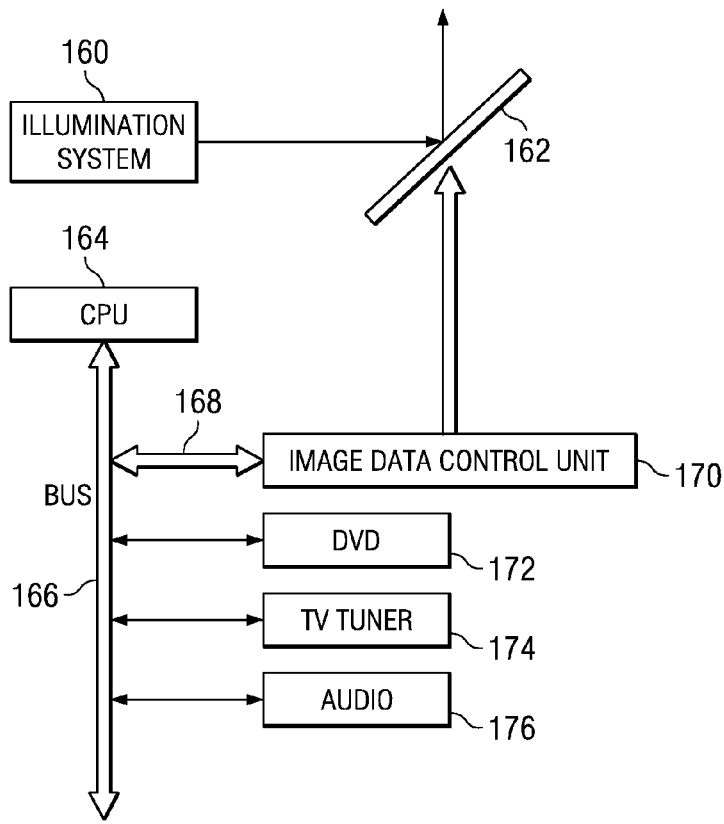
FIG. 4 diagrammatically illustrates an exemplary structure of the integrated system with both computing and imaging capabilities.

The integrated system as discussed above, and many other integrated systems within the scope of this disclosure, can be implemented in many ways, one of which is diagrammatically illustrated in FIG. 4.

Referring to FIG. 4, the integrated system comprises illumination system 160 that is provided for providing light for the integrated system. It is noted that the illumination system may not be necessary when the screen of the integrated system is a self-light emitting panel, or other panels that do not need internal light. The illuminator, when provided, may comprise any suitable illuminators, such as arc lamp and solid-state illuminators, such as lasers and light-emitting-diodes (LEDs). When an arc lamp is used, a color filter (not shown in the figure) having multiple color segments may be provided for splitting the white color light from the arc lamp into desired colors of light, such as red, green, blue, yellow, cyan, magenta, and any combinations thereof. When solid-state illuminators are used as illuminators for the illumination system, an array of solid-state illuminators can be provided for each color. Specifically, the array of illuminators may have slightly different characteristic spectrums (e.g. 20 nm or less) such that the light from the entire array can have specific profiles (e.g. square shapes with desired bandwidths) while the profile maintains the desired centered wavelength.

The illumination system may have other suitable optics such as condensing lens and light integrators. Especially when solid-state illuminators are used, diffusers and/or fly-eye lens may be used to accomplish desired far-field illumination profiles, such as illumination field shapes, intensities, and intensity distributions across the far-field illumination field.

Light valve 162 is provided for generating the desired image based on image data derived from the desired image to be produced. The light valve comprises an array of individually addressable pixels that can be operated at digital modes (e.g. ON and OFF state) or analog modes. In general, the total number of pixels of the light valve determines the least resolution of the image that can be displayed by the integrated system; and is referred to as the imaging resolution of the integrated system. As an example, the light valve may have a resolution of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, and 1920×1080 or higher, or integer multiples and fractions of these resolutions. Of course, other resolutions are also applicable. With the light valve of a specific resolution, images displayed on the screen can have a resolution higher than the specific resolution of the light valve. This can be achieved by moving the modulated light from each pixel of the light valve at different locations on the screen with the moving speed higher than a threshold value (e.g. the flicker time of human eyes) such that the viewer's eyes can not tell the moving.

Depending upon specific system configuration, the light valve can be an inlay screen as discussed above with reference to FIG. 1a through FIG. 3b. In other examples, the light valve can be a separate functional member from the inlay screen and enclosed within the enclosure of the integrated system. In later instances, the light valve is preferably (though not required) a spatial light modulator, such as a micromirror-based spatial light modulator (e.g. DMD by Texas Instruments, Inc.) or other types of spatial light modulators, such as liquid-crystal-on-silicon panels. Regardless different natures, the light valve is provided for modulating the incident light based on image data (e.g. bitplane data) derived from the desired images. The modulated light can be directed to the screen for viewing through optics, such as projection lens and folding mirrors if necessary.

As discussed above, the light valve can be the inlay screen, especially when the light valve is a self-light emitting panel. In this instance, the illumination system may not be necessary. The light valve emits light from individual pixels of the light valve based upon the image data (e.g. bitplane data) derived from the desired images to be produced; and the emitted light from the individual pixels together form the desired image that can be viewed.

Image data for light vale 162 can be provided by image data control unit 170 of the integrated system, as shown in the figure. In one example, the image data control unit is an integrated functional member dedicated for preparing image data (e.g. bitplane data) usable by the light vale from image signals of other formats, such as digital (or analog) image signals from peripheral image sources or devices, such as DVD, CD, image storages, camcorders/cameras, and many other sources. For this purpose, the image data controller (170) may comprise an image data formatter, such as that set forth in U.S. Pat. No. 5,278,652 issued Jan. 11, 1994, the subject matter being incorporated herein by reference. Along with the image data formatter, there can be other image processing functional modules, such as a decimator, an analog-digital/digital-analog converter(s) (AD/DA), a color mapping table, a signal pre-processing unit, pull-down detector, and buffer/image storage.

The decimator, when provided, is used for converting digital image signals into a format suitable for storage in an image buffer, as set forth in U.S. Pat. No. 5,278,652 issued Jan. 11, 1994. The AD/DA converter, when provided, is for converting the image signals between analog and digital formats. Especially when the incoming image signals are standard analog signals (e.g. analog TV signals), the AD/DA converter can be used for converting the analog imaging component signal into proper digital formats, wherein the analog imaging component signal of the incoming analog signal can be split from the analog signal from audio signal by the pre-processing unit. The color mapping table, which can be a two-dimensional or a three dimensional (e.g. BrilliantColor™ by Texas Instruments, Inc.) lookup table, can be provided for mapping the incoming digitized image signal (e.g. RGB data) into color image data associated with colors (e.g. R-G-B-Y-C-M) provided by the integrated system.

The image data control unit (170) may have other functional members, such as a control unit for controlling operations of the light valve. In particular, the control unit can be designated for delivering the derived image data (e.g. bitplane data) to the individual pixels of the light valve through row and column decoders, as well as wordline and bitlines of the light valve. The clock of the light valve can also be controlled by the control unit of the image data control unit (170).

In some examples, the image data control unit (170) may have a separate digital-processing-unit (DSP) dedicated for processing image signals for enhanced performance. Depending upon specific configurations, the image data control unit can be a standalone software module implemented as a sequence of computer-executable instructions stored in a computer-readable medium. Alternatively, the image data control unit can be an integrated electronic device implemented in an application-specific-integrated circuit, a field-programmable-gate-array, or other suitable electronic circuits, or any combinations thereof.

The image data control unit (170) can be connected to other functional members through buses, such as bus 168 and bus 166. In the example as shown in FIG. 4, the image data control unit is connected to system bus 166 through bus 168, wherein the system bus connects other functional members to central-processing-unit (CPU) 164 of the integrated system. The central processing unit comprises a standard algorithmic-logic-unit (ALU) for performing algorithmic and logic operations for the integrated system. Other functional members, such as memories, caches, storages, as well as peripheral devices, such as modems, phone TAMs (telephone/FAX answering machines), internet cards, keyboards/mouses, joysticks, scanners, printers, codec speakers (176), TV tuners (174), auxiliary external screens/monitors, and optical devices, such as DVDs (172), HDDs, blue-rays, VCRs, cameras/camcorders, and flash drives, and many other peripheral devices, can be connected to the CPU and/or integrated data control unit 170 and each other (when necessary) through system bus 166 and other data/control signal buses, and/or other types of connections, such as connection lines printed on the motherboard of the integrated system, cables, and dedicated sockets.

To accomplish high integration by eliminating as many repeating functions as possible as compared to simple combination of an existing display system with a computer (e.g. a personal-computer), the basic integrated system can be (though not required) configured such that there substantially no repeating functional members. In other words, the integrated system would not operate properly or the performance would be significantly reduced below the tolerance by removing a functional member from the integrated system with a basic configuration. However, for improving the performance of the integrated system, auxiliary functional members, such as storage devices and memory cards, can be added.

For simplifying connections of enclosed functional members within the enclosure of the system, the functional members can be substantially connected within the enclosure through, for example, electronic connection lines printed on an electronic print board, sockets, headers, slots, connectors, and/or other methods that are preferably embedded in or integrated with the electronic print board. Specifically, the image data control unit, as well as the light valve especially when it is a spatial light modulator, can be integrated on the electronic print board. Of course, other functional members, such as the illumination system, the optics, and the light valves when it is an inlay screen, can be installed in a place separate from the electronic print board. Connections to such functional members to other functional members can be accomplished through sockets and cables, which are preferably enclosed within the system enclosure.

Figure 5:
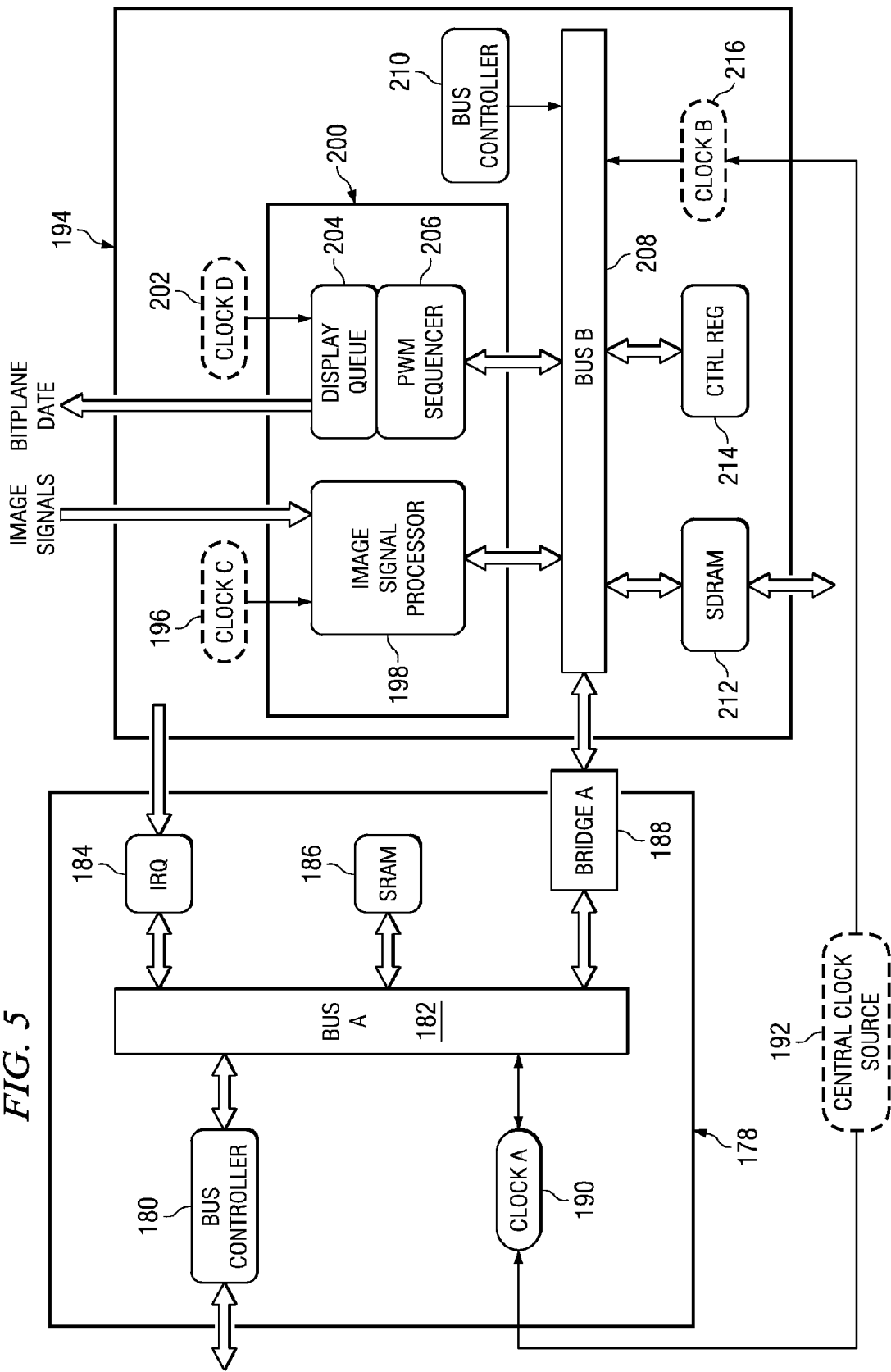
FIG. 5 diagrammatically illustrates another exemplary structure of the integrated system with both computing and imaging capabilities.

As an exemplary implementation, FIG. 5 schematically illustrates a diagram of an integrated system. For simplicity purpose, some of the functional members/modules for computing functions are omitted. Referring to FIG. 5, multiple buses are provided. Bus A 182 and the functional modules connected thereto form a central unit 178 that is responsible for controlling and initializing other functional modules of the integrated driver (e.g. image data control unit 170 in FIG. 4) and other components (e.g. the illumination system and/or the light valve) of the integrated system. Bus B 208 and functional modules connected thereto form a display control unit 194. The buses A and B are linked via bridge A 188.

The central control unit (178) may further comprise functional modules IRQ 184, SRAM 186, clock A 190, bus controller 180, and other necessary modules. The display control unit (194) further comprises image unit 200, SDRAM interface 212, control register 214, and bus controller 210. The image unit (200) may further comprise image signal processor 198, display queue 204, and pulse-width-modulation (PWM) sequencer 206. The display control unit (194) may also comprise clocks 196, 202, and 216. Of course, not all of these clocks are necessary. In one example, clock 216 of bus B 208 can be a derivative of clock A 190 of the bus A. In another example, clocks A 190 and B 216 are derivatives of central clock source 192, which may or may not be installed within the integrated driver. The display control unit (194) can be a functional member of the image data control unit (170) as discussed above with reference to FIG. 4; and can be connected to the CPU of the integrated system through a bus structure. For example, the image signal processor (198) of the display control unit (194) can be directly connected to the CPU for receiving image data/control signals when necessary. The image signal processor can also be connected to any image signal sources that provide image signals. Other functional members/modules can be connected to any functional members/modules related to computing capability of the integrated system as desired.

At the beginning of the display application, for example, when the user turns the power on, central control unit 178 of the integrated driver starts to initialize the other functional modules, such as functional modules of the bus B in the integrated driver. For example, the central control unit loads default parameters (e.g. from an on-board memory) and delivers those default parameters to image signal processor 198 of the image data processing unit in the integrated driver. Meanwhile, the central control unit synchronizes the components, such as the illumination system and the light valve.

After the initialization, the central control unit instructs the image data processing unit to receive image data of a standard format and processes the received data into bitplane data. Specifically, image signal processor 198 of the image data processing unit retrieves data of images or videos from an image source and converts the retrieved image data into bitplane data. For example, the image source provides standard RGB data of videos. The image signal processor retrieves the RGB data and applies a series of predefined data processes, such as, PWM encoding and transpose to the retrieved RGB data. The transpose operation converts the pixel data of the videos into bitplane data according to the configuration of the memory cells and wordlines of the pixels of the light valve. SDRAM interface 212 collects the bitplane data and stores the collected bitplane data into a storage medium, such as a frame buffer. After certain amount (e.g. a frame) of the bitplane data is collected and stored in the frame buffer, PWM sequencer 206 retrieves the bitplane data from the frame buffer through the bus B and SDRAM interface and passes the retrieved data onto display queue 204. At this stage, the integrated driver has prepared the bitplane for updating the memory cells of the light valve so as to drive the pixels of the light valve for displaying the desired image by modulating light from the illumination system.

A light valve pixel control unit, which can be an embedded member in the light valve, or a member of the image data control unit, retrieves the bitplane data in the display queue and receives a number of control signals, such as a sequence of clock signals and command signals from the integrated driver. With the control signals, the light valve pixel control unit sends activations signals to the wordline decoder to sequentially activate the wordlines of the light valve and delivers corresponding bitplane data to the bitlines of the light valve for updating the status of the pixels of the light valve. The activated memory cells are then updated using the corresponding bitplane data.

Figure 6:
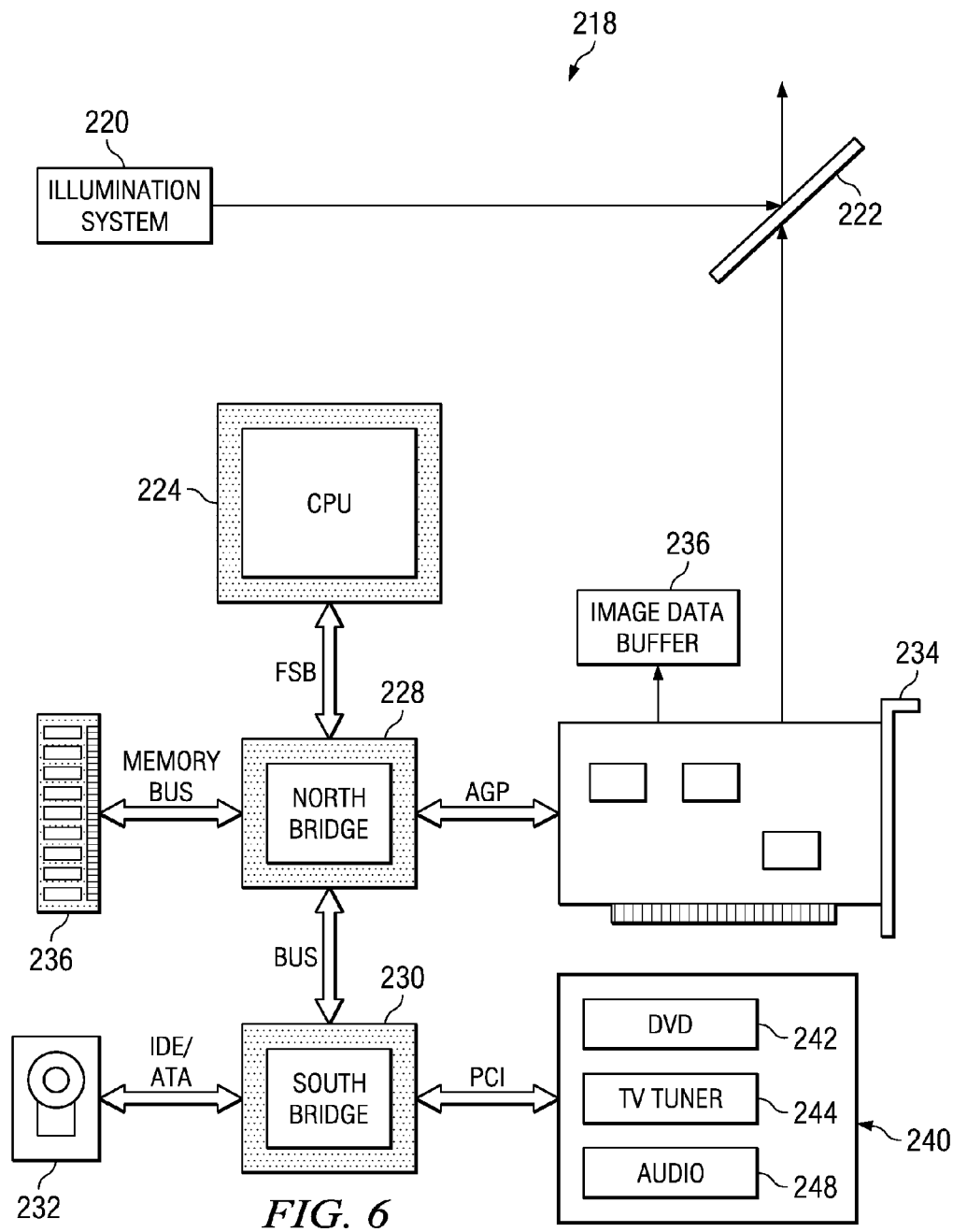
FIG. 6 diagrammatically illustrates yet another exemplary structure of the integrated system with both computing and imaging capabilities.

Another exemplary implementation of the integrated system in FIG. 4 is schematically illustrated in FIG. 6. Referring to FIG. 6, integrated system 218 comprises illumination system and light valve 222, which can be the same as the illuminator and light valve discussed above with reference to FIG. 4. The light valve is connected to image data control unit 234, which can be the image data control unit as discussed above with reference to FIG. 4. In one example, the image data processing unit can be connected to a dedicated image buffer (236). In another example, the image data buffer (236) can be integrated with the image data processing unit (234).

The image data processing unit is connected to north-bridge 228 through AGP bus; and the north-bridge and the AGP bus both can be standard units in existing computers. The north-bridge is connected to the CPU (224) through front-side-bus 228. System memory 226 is connected to the north-bridge through a memory bus. South-bridge 230, which can be a standard unit in existing computer systems, is connected to the north-bridge through a bus in which data and control signals can be transported. Connected to the south-bridge can be hard-drive 232 through a standard IDE/ATA bus. Peripheral devices, especially PCI devices (240), such as a DVD (242), a TV tuner (244), an audio codec (248), and many other devices, can be connected to the south-bridge through a PCI bus and/or other suitable bus capable of transporting data and/or control signals.

As discussed above, the image data control unit (170) as illustrated in FIG. 4 can be integrated therein other imaging components—the components related to producing/processing images, such as, but not limited to, light sources, optics, light valves, image processing units, buffers, controllers, clocks, interfaces, and any combinations thereof. The integrated components can be interconnected through electronic connections printed on an electronic print board, sockets, slots, wires, any other suitable means, or any combinations thereof. As a way of example, FIG. 7 schematically illustrates an exemplary integrated image data control unit.

Figure 7:
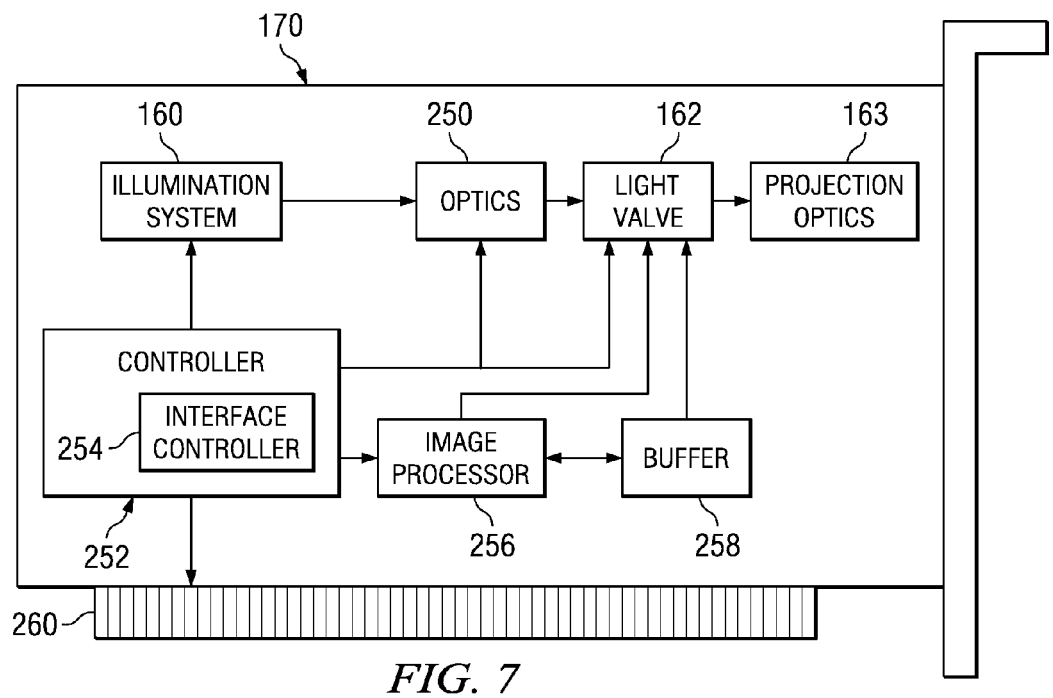
FIG. 7 diagrammatically illustrates an exemplary image data control unit integrated therein imaging components.

Referring to FIG. 7, image data control unit 170 in this example comprises illumination system 160, optics 250, light valve 162, projection optics 163, controller 252, image processor 256, buffer 258, and interface 260. The illumination system can be one as discussed above with reference to FIG. 4 for providing illumination light for the system. Optics 250 is provided for directing the illumination light from the illumination system onto the light valve; and can be integrated with the light valve. In particular, optics 250 can be holographic optical elements with specific diffractive patterns, such as patterns for beam-splitting, beam-bending, beam-reflecting, and bean-shaping. Light valve 162 comprises an array of individually addressable pixels for modulating the illumination light based on specific image data so as to performing desired imaging functions, such as image projection. As an alternative feature, projection optics 163 can be provided for projecting the modulated light from the light valve onto a screen when the imaging function of the integrated system is configured to be a projector, such as a rear projector or a front projector.

Image processor 256 is in communication with the light valve for processing image data and the processed image can be directly loaded to the pixels of the light valve for setting operational states of the pixels of the light valve. As an alternative feature, buffer 258 is connected to the light valve and the image processor for storing image data and/or control signals (e.g. instruction data).

Controller 252, which can be a dedicated digital signal processor, is provided for controlling operations on the image data control unit (170). For example, controller 252 may comprise interface controller 254 that is designated for controlling data/control signal flow between external/peripheral devices in communication with the image data control unit (170) and the image data control unit (170). Communications between the functional modules and external devices can be accomplished through dedicated I/O ports (e.g. 260) of a particular communication protocol or standards, such PCI. In other examples, the I/O ports can be configured to be compatible with multiple communication protocols or stands so as to provide larger flexibility.

With the above configuration, the image data control unit (170) as discussed above can be a stand-alone integrated device such that an existing computing system (e.g. PC) can be upgraded to an integrated system with imaging capability by simply plugging in the image data control unit into the proper slot (e.g. PCI) of the computing system.

Figure 8:
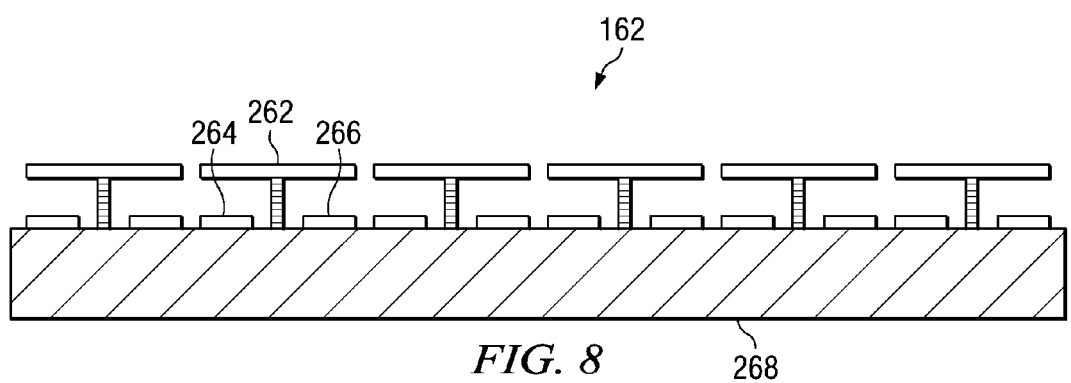
FIG. 8 schematically illustrates a cross-sectional view of an exemplary light valve of FIG. 7 wherein the pixels of the light valve are deflectable and reflective micromirrors.

As discussed above, the light valve of the integrated system can be any suitable MEMS devices with individually addressable pixels, one of which is a light valve with deflectable and reflective micromirrors, as schematically illustrated in FIG. 8. For illustration purpose, the light valve (162) in FIG. 8 illustrates six (6) micromirrors. It will be appreciated by those skilled in the art that the light valve may have any suitable number of micromirrors with the total number of micromirrors (pixels) being referred to as the natural resolution of the light valve.

Referring to FIG. 8, the light valve (162) comprises an array of micromirror devices each of which comprises a reflective mirror plate (262) and an addressing electrode (e.g. electrodes 264 and 266) formed on semiconductor substrate 268 for deflecting the mirror plate. In this example, the mirror plates are formed on the semiconductor substrate. In another example, the mirror plates can be formed on a separated substrate, such as a light transmissive substrate (e.g. glass, quartz, and sapphire).

It will be appreciated by those of skill in the art that a new and useful integrated system capable of both imaging and computing has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. For example, a screen with an aperture attached thereto can be employed by the integrated system if needed. Therefore, the devices and methods as described herein contemplate all such embodiments as may come within the scope of the following claims and equivalents thereof.

We claim:

1. An integrated system, comprising:
computing means for performing algorithmic or logic operations;
imaging means for projecting images produced by the system on a screen with a light valve;
and wherein the computing and imaging means are enclosed within a system enclosure and the screen is a rear projection screen forming an integral part of the system enclosure;
the light valve is directly connected with the imaging means and the CPU of the computing means;
wherein the light valve comprises an array of micromirror devices which comprises a reflective mirror plate and an addressing electrode formed on semiconductor substrate for deflecting the mirror plate;
images displayed on the screen can have a resolution higher than the specific resolution of the light valve;
wherein the computing means, the imaging means and the light valve all are integrated in the rear projection system.

2. The system of claim 1, wherein the target of a projected image is a screen separate from the integrated system.

3. The system of claim 1, wherein the target of a projected image is a screen integral with the integrated system.

4. The system of claim 1, wherein the imaging means comprises an image data control unit that is connected to a CPU of the computing means and the light valve for preparing image data that can be displayed by the light valve.

5. The system of claim 4, wherein the image data control unit is integrated with an electronic print board on which the CPU is disposed and connected to other functional members.

6. The system of claim 4, wherein an image signal processor unit comprises a data formatter capable of formatting a set of digital image signals into a bitplane.

7. The system of claim 6, wherein the image signal processing unit is a dedicated electronic device that is implemented in a field-programmable-gate-array, an application-specific-integrated circuit, or a digital-signal-processing unit.

8. The system of claim 1, wherein the light valve is a spatial light modulator comprising an array of individually addressable pixels, a self-light emitting panel, or an interferometric modulator panel.

9. The system of claim 1, wherein the system enclosure comprises an inlay screen attached to a side wall of the system enclosure.

10. The system of claim 9, wherein the inlay screen is the light valve comprising an array of individually addressable pixels.

11. The system of claim 10, wherein the inlay screen is attached to the side wall with a position adjusting mechanism such that a position of the screen can be dynamically adjusted.

12. The system of claim 9, wherein the inlay screen is a translucent plate or film for a rear-projector.

13. The system enclosure of claim 9, wherein the inlay screen is a translucent plate or film for use in a rear-projector.

14. The system enclosure of claim 9, wherein the inlay screen is a foldable screen that can be folded or rolled and stored in an extending unit attached to the enclosure.

15. The system enclosure of claim 9, wherein the inlay screen is attached to the side wall such that the inlay screen is capable of moving relative the side wall in plurality of directions.

16. The system of claim 1, wherein the means for projecting includes at least alight source which comprises an arc lamp, or a solid-state illuminator.

17. The system of claim 1, wherein the system enclosure comprises first and second portions that are attached to each other such that the first portion is capable of moving relative to the second portion; and wherein the second portion has disposed therein the CPU of the means for computing.

18. The system of claim 17, wherein the first portion has disposed therein a projection lens for projecting light from the light valve onto a screen.

19. The system of claim 17, wherein the second portion further comprises the light valve and a projection lens that is capable of projecting the light from the light valve onto a screen.

* * * * *